United States Patent
Schulte (10) Patent No.: US 8,297,177 B2
(45) Date of Patent: Oct. 30, 2012

(54) BALLISTIC PROJECTILE ARMOUR

(75) Inventor: Darren S. Schulte, St. Albert (CA)

(73) Assignee: In the Line of Fire Inc., Edmonton (CA)

( * ) Notice: Subject to any disclaimer, the term of this patent is extended or adjusted under 35 U.S.C. 154(b) by 101 days.

(21) Appl. No.: 12/596,257

(22) PCT Filed: May 23, 2008

(86) PCT No.: PCT/CA2008/000980
§ 371 (c)(1),
(2), (4) Date: Oct. 16, 2009

(87) PCT Pub. No.: WO2008/144892
PCT Pub. Date: Dec. 4, 2008

(65) Prior Publication Data
US 2010/0107862 A1 May 6, 2010

Related U.S. Application Data

(60) Provisional application No. 60/940,092, filed on May 25, 2007.

(51) Int. Cl.
*F41H 5/04* (2006.01)
(52) U.S. Cl. .................. 89/912; 89/36.02; 89/36.05
(58) Field of Classification Search ............. 89/36.02, 89/904, 910, 912, 913, 36.05
See application file for complete search history.

(56) References Cited

U.S. PATENT DOCUMENTS

| | | | | |
|---|---|---|---|---|
| 3,894,472 A * | 7/1975 | Davis | ............ | 89/36.02 |
| 4,061,815 A * | 12/1977 | Poole, Jr. | ............ | 89/36.02 |
| 4,198,454 A * | 4/1980 | Norton | ............ | 89/36.02 |
| 4,404,889 A * | 9/1983 | Miguel | ............ | 89/36.02 |
| 4,529,640 A * | 7/1985 | Brown et al. | ............ | 89/36.02 |
| 4,739,690 A * | 4/1988 | Moskowitz | ............ | 89/36.02 |
| 4,822,657 A * | 4/1989 | Simpson | ............ | 89/36.02 |
| 4,989,493 A * | 2/1991 | Blommer et al. | ............ | 89/912 |
| 5,059,467 A * | 10/1991 | Berkovitz | ............ | 89/36.02 |
| 5,200,256 A * | 4/1993 | Dunbar | ............ | 89/36.12 |
| 5,349,893 A * | 9/1994 | Dunn | ............ | 89/36.05 |
| 5,463,929 A * | 11/1995 | Mejia | ............ | 89/36.02 |
| 5,545,455 A * | 8/1996 | Prevorsek et al. | ............ | 428/76 |
| 5,635,288 A | 6/1997 | Park | | |
| 5,736,474 A | 4/1998 | Thomas | | |
| 5,996,115 A * | 12/1999 | Mazelsky | ............ | 89/36.02 |
| 6,138,275 A * | 10/2000 | Sacks | ............ | 89/36.05 |
| 6,277,463 B1 * | 8/2001 | Hamilton et al. | ............ | 428/106 |
| 6,298,765 B1 * | 10/2001 | Dvorak | ............ | 89/36.02 |
| 6,370,690 B1 * | 4/2002 | Neal | ............ | 89/36.02 |

(Continued)

FOREIGN PATENT DOCUMENTS

CA 2489981 9/2005

(Continued)

*Primary Examiner* — Jonathan C Weber
(74) *Attorney, Agent, or Firm* — Davis & Bujold PLLC (57) ABSTRACT

Ballistic projectile armour includes a hard shell, kinetic energy absorption material and an energy diffusing backing layer. The hard shell is made from a material capable of deforming a projectile and slowing a velocity of the projectile. The kinetic energy absorption material is capable of deforming to further slow and capture the projectile after it has pierced the hard shell. The energy diffusing backing layer is capable of diffusing energy transferred from the projectile into the kinetic energy absorption material. Elastic containment keeps the kinetic energy absorption material sandwiched between the hard shell and the energy diffusing backing, while accommodating expansion of the kinetic energy absorption material during energy absorption.

9 Claims, 2 Drawing Sheets

U.S. PATENT DOCUMENTS

| | | | |
|---|---|---|---|
| 6,408,733 B1 | 6/2002 | Perciballi | |
| 6,497,966 B2 * | 12/2002 | Cohen | 89/36.02 |
| 6,510,777 B2 * | 1/2003 | Neal | 89/36.05 |
| 6,562,435 B1 | 5/2003 | Brillhart, III et al. | |
| 6,571,677 B1 * | 6/2003 | Kaura | 89/36.02 |
| 6,698,331 B1 * | 3/2004 | Yu et al. | 89/36.02 |
| 6,792,843 B2 | 9/2004 | Mohr et al. | |
| 6,807,891 B2 * | 10/2004 | Fisher | 89/36.02 |
| 6,825,137 B2 * | 11/2004 | Fu et al. | 428/911 |
| 6,899,009 B2 * | 5/2005 | Christiansen et al. | 89/36.02 |
| 6,922,847 B2 * | 8/2005 | Bachner, Jr. | 2/2.5 |
| 7,216,576 B2 * | 5/2007 | Henry et al. | 89/36.02 |
| 7,520,207 B1 * | 4/2009 | Fuqua et al. | 89/36.07 |
| 7,549,366 B2 | 6/2009 | Park et al. | |
| 7,934,444 B2 * | 5/2011 | Carberry et al. | 89/36.02 |
| 2004/0118271 A1 * | 6/2004 | Puckett et al. | 89/36.02 |
| 2004/0216595 A1 * | 11/2004 | Dickson | 89/36.02 |
| 2005/0193667 A1 * | 9/2005 | Henry et al. | 52/309.9 |
| 2010/0294123 A1 * | 11/2010 | Joynt et al. | 89/36.02 |
| 2011/0041676 A1 * | 2/2011 | Park et al. | 89/36.02 |

FOREIGN PATENT DOCUMENTS

| | | | |
|---|---|---|---|
| GB | 2276935 A | * | 10/1994 |
| WO | 01/85443 A1 | | 11/2001 |

* cited by examiner

BALLISTIC PROJECTILE ARMOUR

FIELD

The present application relates armour capable of stopping a ballistic projectile, as body armour, vehicle armour or in other applications where armoured protection from a ballistic projectile is desirable.

BACKGROUND

Hard body armour typically incorporates an ultra-hard, ballistic ceramic top layer combined with a laminated blend of unidirectional-oriented fiber bundles which work together to stop bullets and fragments. Depending on the level of threat (i.e. 9 mm 124 grain or 7.62 mm/M80 NATO 147 grain.), hard armour works by disrupting the aerodynamic shape of the bullet and dissipating the energy through the shattering of the ceramic top layer. The blunted or shattered bullet and the ceramic fragments (secondary projectile) are caught in the laminated blend of high performance fibers, thereby inhibiting penetration.

In Canada and the United States, body armour levels are certified by the National Institute of Justice (NIJ). The levels are I, IIA, II, IIIA, III, and IV. Based on extensive laboratory tests, researchers classify any new body armour design into one of the six levels: Level I body armour offers the lowest level of protection and level IV offers the highest. The body armour classes are often described by what sort of weaponry they guard against. The lowest level body armour can only be relied on to protect against bullets with relatively low energy, which tend to have less force on impact. Some higher-level body armour can protect against higher energy bullets (i.e. 44 magnum and 357 magnum). Categories I through IIIA are soft, concealable, and primarily made with Kevlar or other ballistic materials. Type III and Type IV use hard rigid plates made from ceramics, to defeat high energy rifle rounds.

There are two different types of body armour currently on the market and used by law enforcement and the military:

Soft body armour—Soft body armour made with panels of flexible ballistic fabric, such as Kevlar (Trade Mark of Duport). Kevlar-brand fiber works by "catching" a bullet in a multilayer web of woven fabrics. The engaged fibers absorb and disperse the energy of the impact to other fibers in the fabric weave. This transfer of energy occurs at "crossover points" where the fibers are interwoven. Additional energy is absorbed by the other layers in the body armour reducing the amount of transferred energy that causes "blunt trauma." These woven fabrics are strong enough to perform, while offering the additional advantage of being more comfortable to wear than traditional plastic-based (polythylene) shield products. Another soft armour material is Spectra Shield (Trade Mark of Honeywell), it is not a woven material, but instead a thin, flexible ballistic composite made from two layers of unidirectional fibers held in place by flexible resins. These Spectra fibers are arranged so they cross each other at 0 and 90 degree angles. Then, both fiber and resin layers are sealed between two thin sheets of polythylene film.

Current weaknesses of soft body armour are:

Type of stopping power is determined by the number of layers; the higher the caliber of bullet the more layers of ballistic fabric are needed. As layers increase in number they become bulkier, less flexible, and heavier. This creates a disadvantage for the wearer. Without any hard armour (i.e. Ceramic plate) ballistic fabric is incapable of stopping high powered weapons.

If ballistic fabric is subjected to high humidity or any type of liquid the soft armour can lose its integrity. If the soft armour becomes wet, the water acts as a lubricant and allows the projectile to slip between the weaves of the material, thereby injuring the wearer.

Soft-body armour is incapable of stopping sharp-edged objects. Due to the
a. design of ballistic fabric, sharp objects can cut through and penetrate the armour.
4. Ballistic fabric is not recyclable. As each new generation of Kevlar is created, previous generations become obsolete and undesirable for use.

Hard-body armour—Hard-body armour is made out of thick ceramic or metal plates; it functions basically the same way as the iron suits worn by medieval knights: It is hard enough that a bullet or other weapon is deflected. That is, the armour material pushes out on the bullet with the same force (or nearly the same force) which the bullet pushes in, so the armour is not penetrated.

Current weaknesses of hard body armour/protective ceramic plates are:

They are not flexible and deflect energy more than absorb it. This results in the material needing to be very hard.

They are heavy and cumbersome.

Once compromised, the plates must be replaced and new ones purchased resulting in high replacement costs. A single shot can cause this problem and continuous shots can guarantee the plate's failure.

Ceramic plates must be handled with care. If handled carelessly, the plates can crack or chip, rendering the plate ineffective.

Plates must always be inspected after use. This is an expensive and complicated procedure.

Although ceramic plates are effective against most calibers, when the plates are subjected to high caliber rounds (i.e. 7.62×51 mm Ruag AP (Armour Piercing) rounds)) they are compromised and their reliability is unpredictable.

Ceramic plates are not recyclable. Once they are compromised, the plates must be discarded.

These two different types of body armour can be combined to create a stronger type of armour capable of stopping some high-powered rifle rounds depending on the threat level of the armour.

Weaknesses of this combined armour:

Combinations result in heavy and cumbersome plate systems that are uncomfortable for the wearer.

Once the hard armour is compromised the soft armour is ineffective against most ballistic rounds.

If the ceramic plates are broken, the shrapnel of the plates can penetrate the soft armour causing injury of the wearer.

Vehicle Armour

Current Versions of Vehicle Armour

Spaced Armour

Armour with two or more plates spaced a distance apart, called spaced armour, when sloped reduces the penetrating power of bullets and solid shot as after penetrating each plate they tend to tumble, deflect, deform, or disintegrate. When not sloped, they reduce the protection offered by the armour, and detonate explosive projectiles before they reach the inner plates.

Spaced armour protects against high explosive anti-tank (HEAT) projectiles which create a focused jet of plasticized metal, very effective at the focus point, but not around this point. Relatively thin armour plates or even metal mesh can be attached as side skirts or turret skirts on tanks and other armoured vehicles. This light armour detonates the warhead prematurely so that the jet of molten metal is focused well before the main armour, becoming relatively ineffective.

In response to increasingly effective HEAT warheads, integral spaced armour was introduced. This type of armour possesses hollow spaces, increasing the length of travel from the exterior of the vehicle to the interior for a given weight of armour, to reduce the shaped charge's penetrating power.

Sometimes the interior surfaces of these hollow cavities are sloped, presenting angles to the anticipated path of the shaped charge's jet in order to further dissipate its power. For example, a given weight of armour can be distributed in 2 layers 15 cm (6 in) thick instead of a single 30 cm (12 in) layer, giving much better protection against shaped charges.

Today light armoured vehicles mount panels of metal mesh, known as "slat armour", and some main battle tanks carry rubber skirts to protect their relatively fragile suspension and front belly armour.

Composite Armour

Composite armour is armour consisting of layers of two or more materials with significantly different chemical properties; steel and ceramics are the most common types of material in composite armour. Composite armour's effectiveness depends on its composition and may be effective against kinetic energy penetrators as well as shaped charge munitions; heavy metals are sometimes included specifically for protection from kinetic energy penetrators. Composite armour can be highly effective but tends to be cumbersome and heavy as threat levels increase.

Reactive Armour

Explosive reactive armour uses layers of high explosive sandwiched between steel plates. When a shaped-charge warhead hits, the explosive detonates and pushes the steel plates into the warhead, disrupting the flow of the charge's liquid metal penetrator (usually copper at around 500 degrees; it can be made to flow like water by sufficient pressure). It is less effective against kinetic penetrators. Reactive armour poses a threat to friendly troops near the vehicle. Non-explosive reactive armour is an advanced spaced armour which uses materials which change their geometry so as to increase protection under the stress of impact.

Active protection systems use a sensor to detect an incoming projectile and explosively launch a counter-projectile into its path.

Electrically Charmed Armour

Electrically charged armour is a recent development in the UK by the Defense Science and Technology Laboratory. A vehicle is fitted with two thin shells, separated by insulating material. The outer shell holds an enormous electrical charge, while the inner shell is a ground. If an incoming HEAT jet penetrates the outer shell and forms a bridge between the shells, the electrical energy discharges through the jet, disrupting it. Trials have so far been extremely promising, and it is hoped that improved systems could protect against KE penetrators. Developers of the Future Rapid Effect System (FRES) series of armoured vehicles are considering this technology.

Technologies

For greater efficiency, the heaviest armour plates are placed on the front of APVs (Armoured Personnel Vehicles): on the gun mount. Sloping and curving armour both increase its protection. This is due to the fact that the given fixed thickness of armour plate (usually between 10" to 12"), a projectile striking at an angle must penetrate more armour than one impacting perpendicularly. An angled surface also increases the chance of deflecting a projectile. Many APVs have "spall liners" inside of the armour, designed to protect the crew and equipment inside from fragmentation (spallation) released from the impact of enemy shells. Spall liners are made of Kevlar or similar materials.

Current Weaknesses of Vehicle Armour

Current vehicles use thick plates of various metals to protect the personnel inside. These plates are very heavy, cumbersome, and reduce the space inside for the crew.

Due to their mass, the plates can hinder the movement of the vehicle and in some cases must be removed in order for the vehicle to maintain a satisfactory level of maneuverability.

If plates are removed, the vehicle then becomes highly vulnerable to weapons attack, usually in the form of IEDs (Improvised Explosive Devices). IEDs have been known to penetrate the interior of AFVs killing or wounding the vehicle's crew and immobilizing it.

Current weapons such as the AK-47 rifles can fire the 7.62×39 armour piercing round which can penetrate the 10"-12" armour plates on most APVs.

SUMMARY

There is provided a ballistic projectile armour, which includes a hard shell, kinetic energy absorption material and an energy diffusing backing layer. The hard shell is made from a material capable of deforming a projectile and slowing a velocity of the projectile. The kinetic energy absorption material is capable of deforming to further slow and capture the projectile after it has pierced the hard shell. The energy diffusing backing layer is capable of diffusing energy transferred from the projectile into the kinetic energy absorption material. Elastic containment keeps the kinetic energy absorption material sandwiched between the hard shell and the energy diffusing backing, while accommodating expansion of the kinetic energy absorption material during energy absorption.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
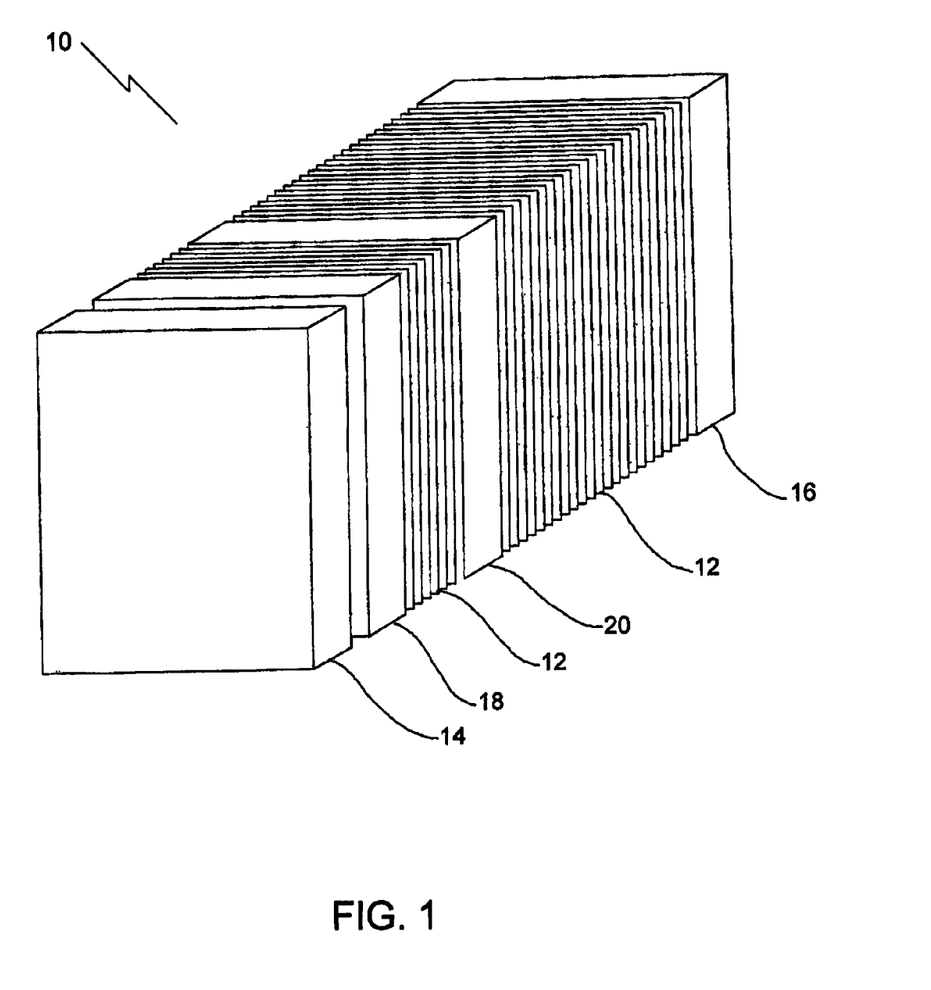
FIG. 1 is an exploded view of an early embodiment of ballistic projectile armour prepared for testing purposes.
Figure 2:
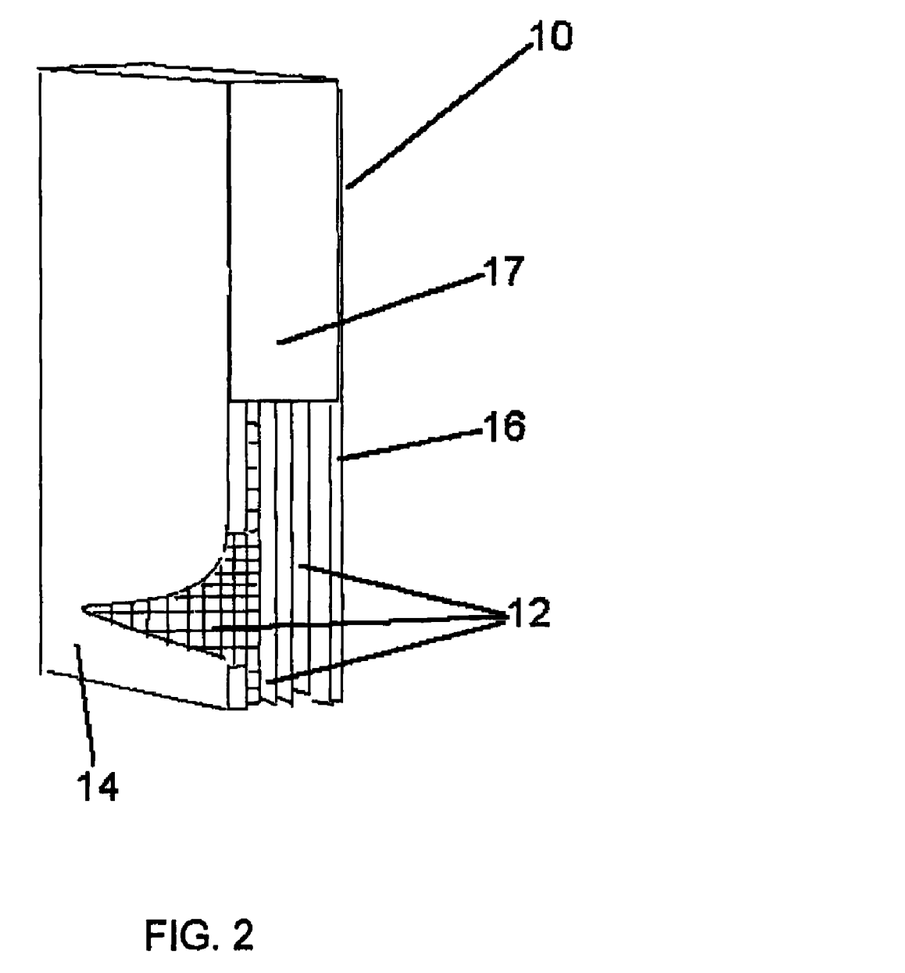
FIG. 2 is a partially cut away perspective view of a recommended embodiment of ballistic projectile armour.

Ballistic projectile armour generally identified by reference numeral 10, will now be described with reference to FIGS. 1 and 2. FIG. 1 depicts an early embodiment which, when tested, showed potential and warranted further testing and engineering study. FIG. 2 depicts a recommended embodiment that resulted from a greater understanding as a result of such further testing and engineering study.

Early Proto-Type Used in Tests

Referring to FIG. 1, ballistic projectile armour 10 was prepared measuring 10 inches×12 inches, 3 inches thick and 9 lbs in gross weight. Layers of ballistic fabric 12 were positioned behind a hard shell 14. The layers of ballistic fabric used are sold under the Trade Mark KEVLAR. There are alternative ballistic fabrics that could be substituted for KEVLAR, one of which is sold under the Trade Mark SPECTRA SHIELD. Hard shell 14 was a ¼ inch aerospace grade aluminum alloy. A layer of ⅛ inch impact resistant polycarbonate was placed on either side of layers of ballistic fabric 12. The order of layers was, therefore, hard shell 14, a layer impact resistant polycarbonate 18, 22-30 layers of ballistic fabric 12, a further layer of impact resistant polycarbonate 20, 6-12 layers of ballistic fabric 12, a backing layer of polycarbonate 16. Upon reviewing FIG. 1 for accuracy, it is noted that not all of the versions tested were exactly as depicted. Some versions the proto-type of ballistic projectile armour 10 that were tested had a further 6 layers of ballistic fabric sandwiched between two further layers of impact resistant polycarbonate. When some of "sandwiches" of ballistic fabric were placed back to back, there sometimes resulted in a doubling of the layers of impact resistant polycarbonate.

During initial testing, the 3 inch ballistic projectile armour 10 was fired upon using an AK-47 rifle firing the 7.62×39 mm mild steel core rounds. A soft Kevlar plate was placed behind ballistic projectile armour 10 to provide evidence should the bullet pass through. Fired at 15 yards, the first 7.62×39 mm MSC round was slowed down enough that it only resulted in superficial damage to the soft Kevlar plate (approximately, 3 mm penetration). The ballistic projectile armour 10 was then fired upon another 10 times using the same weapon, type of round and distance. Ballistic projectile armour 10 stopped a confirmed 7 rounds and potentially 11 out of the 12 rounds. One round is known to have deflected, and the remaining rounds are believed to be imbedded in the ballistic projectile armour 10.

As show below, when subjected to numerous ballistic tests under the NIJ 0101.04 standards, the integrity of the armour system proved to withstand numerous impacts with various calibers of bullets.

Referring to FIG. 2, there is now a greater understanding of why ballistic projectile armour 10 works so effectively. This greater understanding has enabled an optimization to occur. As with the proto-type depicted in FIG. 1, the recommended version in FIG. 2 includes a hard shell 14, kinetic energy absorption material (preferably ballistic fabric 12) and an energy diffusing backing layer (preferably impact resistant polycarbonate 16). However, this description will continue with reference to the roles the layers play, as opposed to specific materials. It is now appreciated that there are other materials that can be substituted and still perform the intended function. Hard shell 14 must be made from a material capable of deforming a projectile and slowing a velocity of the projectile. The kinetic energy absorption material (multiple layers of ballistic fabric 12), must be itself capable of deforming to further slow capture the projectile after it has pierced hard shell 14. Energy diffusing backing layer 16 must be capable of diffusing energy transferred from the projectile into kinetic energy absorption material (multiple layers of ballistic fabric 12). An elastic containment 17 keeps kinetic energy absorption material (multiple layers of ballistic fabric 12) sandwiched between the hard shell 14 and energy diffusing backing 16, while accommodating expansion of kinetic energy absorption material (multiple layers of ballistic fabric 12) during energy absorption.

In order to increase the degree of protection from Level I to Level II, or from Level II to Level III, or from Level III to Level IV; the primary focus must be to increase the amount of kinetic energy absorption material (multiple layers of ballistic fabric 12). A secondary focus is the hardness of hard shell 14, to the extent that the hardness can be increased without unduly increasing weight. An ideal situation is if the hardness can be increased without any increase in weight.

The above described ballistic projectile armour 10 is more effective than ballistic projectile armour presently available commercially. A particular advantage of the above described ballistic projectile armour 10 is that it can take multiple hits from projectiles without losing its effectiveness. Other forms of ballistic projectile armour rapidly degrade after being hit by a second and a third projectile.

It must be noted that clamping and compressing kinetic energy absorption material (multiple layers of ballistic fabric 12) between hard shell 14 and energy diffusing backing layer 16 may decrease the level of protection provided. Kinetic energy absorption material 12 must be able to expand and deform while absorbing energy from the projectile.

It must be noted that the energy diffusing backing layer 16 is not intended to stop the projectile. Should there be insufficient kinetic energy absorption material (multiple layers of ballistic fabric 12) to slow and capture the projectile, the projectile is likely to penetrate energy diffusing backing layer 16. The additional impact resistant polycarbonate layers 18 and 20 provided in the original proto-type have been deemed redundant and removed from the recommended embodiment. More layers of kinetic energy absorption material (multiple layers of ballistic fabric 12) are to be preferred to additional sandwich panels of impact resistant polycarbonate.

Beneficial results have been obtained when the hard shell is made from one of a aerospace grade aluminum alloy, a ballistic grade aluminum alloy or ballistic grade steel alloy. There are also some hard shell composite materials and hard shell polymer plastics that can serve this function. It is undesirable to have a hard shell that shatters. If the hard shell has shattered upon impact of a first projectile, it may have degraded to the point that it will be incapable of performing its function upon impact of subsequent projectiles. The thickness of the hard shell can be increased beyond ¼ inch for some applications. However, with body armour weight is an important factor that can affect the performance of military, police or security personnel. Even with vehicle armour, weight can become a factor that affects the vehicle's performance. At some point the effectiveness of the ballistic projectile armour is best improved by increasing the number of layers of kinetic energy absorption material (multiple layers of ballistic fabric 12).

Beneficial results have been obtained when the energy diffusing backing layer is made from a ballistic grade plastic. In tests, an impact resistant polycarbonate was used. It will be recognized that there are other materials that can spread force so that a person wearing ballistic projectile armour 10 is not subjected to a localized impact force.

Beneficial results have been obtained when kinetic energy absorption material comprises multiple layers of ballistic fabric 12. These can be microfiber mesh fabrics or aramids. In tests, materials sold under the Trade Mark brand names KEVLAR or SPECTRA SHIELD were used. The ballistic fabric can be laminated into a single pad or the ballistic fabric can consist of multiple individual layers. The objective is to create a web that captures the projectile and then is deformed by the projectile. In doing so, the velocity of the projectile is slowed. Upon inspection of the ballistic fabric after testing, portions of the ballistic fabric were heat welded together. This has been taken to be an indication as to the contact time with the projectile.

Beneficial results have been obtained when elastic containment 17 used was an elastic edge binding that binds the hard shell and the energy diffusing layer. The elastic containment can take a number of forms. Elastic containment can consist of a containment pouch. However, best results were obtained when an elastic edge binding was used. The elastic edge binding used can be as simple as an elastic tape.

Ballistic projectile armour 10 is believed to provide advantages for both body armour, vehicle armour and other armour applications. The layers of ballistic fabric 12 are thin and light weight. This enables an increase in protective capability without substantially increasing weight.

For vehicle armour, ballistic projectile armour 10 is thin enough that it can be formed to areas on the vehicle that are deemed vulnerable. For example, the wheel well of a vehicle can be retro-fitted with a formed version of the plate.

Ballistic projectile armour 10 can be interchanged quickly, repaired and reused.

BALLISTIC RESISTANCE TEST

| Chesapeake Testing | Client: In the Line of Fire, Inc. |
|---|---|
| 121 Bata Boulevard, Suite F | Job No.: N056-001-G |
| Belcamp, MD 21017 | Test Date: Nov. 12, 2007 |

Test Panel     Description: IIA plus soft armor vest

Manufacturer: In the Line of Fire, Inc     Sample No.: CDS-G

| Size: | See remarks | Heat No.: | NA | Date Received: | Nov. 12, 2007 |
|---|---|---|---|---|---|
| Thickness: | See remarks | Weight: | See remarks | Via: | Hand Carried |
| Avg. Thick: | NA | Hardness: | NA | Returned: | Hand Carried |
| | | Plies/Laminates: | NA | | |

Setup

| Shot Spacing: | Per NIJ-STD-0101.04 | Primary Vel. Screens: | 6.5 ft, 11.5 ft | Range No.: | 2 |
|---|---|---|---|---|---|
| | Level IIIA | Primary Vel. Location: | 9 ft | Temp: | 68° F. |
| Witness Panel: | Clay | Range to Target: | 16.5 ft | BP: | 30.27 inHg |
| Obliquity: | 0° and 30° | Target to Witness: | 0 in | RH: | 37% |
| Backing Material: | 5.5 in Clay/Plywood | | | Barrel/Gun: | CDS-0193 |
| Condition: | Wet | | | Gunner: | J. McDowell |
| | | | | Recorder: | Craig Thomas |

Ammunition

| Projectile | Lot No. | Powder |
|---|---|---|
| (1) .44-mag., 240-grain SJHP | Lot No.: Remington 23592 | IMR 4227 |

Applicable Standards or Procedures (1) Clay Drops - 17 mm, 17 mm, 18 mm, 18 mm, 17 mm
(2) NIJ-STD-0101.04 Level IIIA (abbreviated)

| Shot No. | Ammo | Time 1 (μs) | Vel. 1 (ft/s) | Time 2 (μs) | Vel. 2 (ft/s) | Avg Vel. (ft/s) | Penetration | Footnotes |
|---|---|---|---|---|---|---|---|---|
| 1 | 1 | 3500 | 1429 | 3512 | 1424 | 1426 | None | Def. 16 mm |
| 2 | 1 | 3484 | 1435 | 3494 | 1431 | 1433 | None | Def. 28 mm |
| 3 | 1 | 3462 | 1444 | 3472 | 1440 | 1442 | None | Def. 28 mm |
| 4 | 1 | 3492 | 1432 | 3503 | 1427 | 1430 | None | (a) |
| 5 | 1 | 3474 | 1439 | 3485 | 1435 | 1437 | None | (a) |
| 6 | 1 | 3432 | 1457 | 3442 | 1453 | 1455 | None | Def. 38 mm |

Remarks:     Footnotes:
Plate size: 10 × 12 in, weight: 1.78 lbs     (a) Impacted at 30° obliquity.
Vest size: 44-46 tall, weight: 1.82 lbs

BALLISTIC RESISTANCE TEST

| Chesapeake Testing | Client: In the Line of Fire, Inc. |
|---|---|
| 121 Bata Boulevard, Suite F | Job No.: N056-001-F |
| Belcamp, MD 21017 | Test Date: Nov. 12, 2007 |

Test Panel     Description: IIA

Manufacturer: In the Line of Fire, Inc     Sample No.: CDS-F

| Size: | 10 × 12 in | Heat No.: | NA | Date Received: | Nov. 12, 2007 |
|---|---|---|---|---|---|
| Thickness: | 0.503 in; 0.439 in; | Weight: | 1.93 lbs | Via: | Hand Carried |
| | 0.453 in; 0.498 in | Hardness: | NA | Returned: | Hand Carried |
| Avg. Thick: | 0.473 in | Plies/Laminates: | NA | | |

Setup

| Shot Spacing: | Per NIJ-STD-0101.04 | Primary Vel. Screens: | 6.5 ft, 11.5 ft | Range No.: | 2 |
|---|---|---|---|---|---|
| | Level IIA | Primary Vel. Location: | 9 ft | Temp: | 68° F. |
| Witness Panel: | Clay | Range to Target: | 16.5 ft | BP: | 30.27 inHg |
| Obliquity: | 0° and 30° | Target to Witness: | 0 in | RH: | 37% |

BALLISTIC RESISTANCE TEST -continued

| Backing Material: | 5.5 in Clay/Plywood | | Barrel/Gun: | CDS-0193 |
|---|---|---|---|---|
| Condition: | Wet | | Gunner: | J. McDowell |
| | | | Recorder: | Craig Thomas |

Ammunition

| Projectile | Lot No. | Powder |
|---|---|---|
| (1) .40-ca., 180-grain S&W FMJ | Lot No.: Remington 23686 | Accurate No. 2 |

Applicable Standards or Procedures (1) Clay Drops - 17 mm, 17 mm, 18 mm, 18 mm, 17 mm
(2) NIJ-STD-0101.04 Level IIA (abbreviated)

| Shot No. | Ammo | Time 1 (μs) | Vel. 1 (ft/s) | Time 2 (μs) | Vel. 2 (ft/s) | Avg Vel. (ft/s) | Penetration | Footnotes |
|---|---|---|---|---|---|---|---|---|
| 1 | 1 | 4792 | 1043 | 4792 | 1043 | 1043 | None | Def. 18 mm |
| 2 | 1 | 4632 | 1079 | 4633 | 1079 | 1079 | None | Def. 16 mm |
| 3 | 1 | 4594 | 1088 | 4595 | 1088 | 1088 | None | Def. 15 mm |
| 4 | 1 | 4594 | 1088 | 4594 | 1088 | 1088 | None | (a) |
| 5 | 1 | 4538 | 1102 | 4539 | 1102 | 1102 | None | (a) |
| 6 | 1 | 4750 | 1053 | 4750 | 1053 | 1053 | None | Def. 19 mm |

Remarks:   Footnotes:
(a) Impacted at 30° obliquity.

BALLISTIC RESISTANCE TEST

| Chesapeake Testing | Client: In the Line of Fire, Inc. |
|---|---|
| 121 Bata Boulevard, Suite F | Job No.: N056-001-E |
| Belcamp, MD 21017 | Test Date: Nov. 12, 2007 |

Test Panel    Description: IIIA Light

| Manufacturer: In the Line of Fire, Inc | | Sample No.: CDS-E | | |
|---|---|---|---|---|
| Size: | 10 × 12 in | Heat No.: | NA | Date Received: | Nov. 12, 2007 |
| Thickness: | 0.630 in; 0.602 in; | Weight: | 2.97 lbs | Via: | Hand Carried |
| | 0.592 in; 0.597 in | Hardness: | NA | Returned: | Hand Carried |
| Avg. Thick: | 0.605 in | Plies/Laminates: | NA | | |

Setup

| Shot Spacing: | Per NIJ-STD-0101.04 | Primary Vel. Screens: | 6.5 ft, 11.5 ft | Range No.: | 2 |
|---|---|---|---|---|---|
| | Level IIIA | Primary Vel. Location: | 9 ft | Temp: | 68° F. |
| Witness Panel: | Clay | Range to Target: | 16.5 ft | BP: | 30.27 inHg |
| Obliquity: | 0° and 30° | Target to Witness: | 0 in | RH: | 37% |
| Backing Material: | 5.5 in Clay/Plywood | | | Barrel/Gun: | CDS-0193 |
| Condition: | Wet | | | Gunner: | J. McDowell |
| | | | | Recorder: | Craig Thomas |

Ammunition

| Projectile | Lot No. | Powder |
|---|---|---|
| (1) .44-mag., 240-grain SJHP | Lot No.: Remington 23592 | IMR 4227 |

Applicable Standards or Procedures (1) Clay Drops - 17 mm, 17 mm, 18 mm, 18 mm, 17 mm
(2) NIJ-STD-0101.04 Level IIIA (abbreviated)

| Shot No. | Ammo | Time 1 (μs) | Vel. 1 (ft/s) | Time 2 (μs) | Vel. 2 (ft/s) | Avg Vel. (ft/s) | Penetration | Footnotes |
|---|---|---|---|---|---|---|---|---|
| 1 | 1 | 3488 | 1433 | 3498 | 1429 | 1431 | None | Def. 28 mm |
| 2 | 1 | 3515 | 1422 | 3525 | 1418 | 1420 | None | Def. 17 mm |
| 3 | 1 | 3494 | 1431 | 3503 | 1427 | 1429 | None | Def. 18 mm |

BALLISTIC RESISTANCE TEST -continued

| | | | | | | | | |
|---|---|---|---|---|---|---|---|---|
| 4 | 1 | 3452 | 1448 | 3461 | 1445 | 1447 | None | (a) |
| 5 | 1 | 3472 | 1440 | 3482 | 1436 | 1438 | None | (a) |
| 6 | 1 | 3456 | 1447 | 3465 | 1443 | 1445 | None | Def. 20 mm |

Remarks:  
Footnotes:  
(a) Impacted at 30° obliquity.

BALLISTIC RESISTANCE TEST

Chesapeake Testing  
121 Bata Boulevard, Suite F  
Belcamp, MD 21017

Client: In the Line of Fire, Inc.  
Job No.: N056-001-D  
Test Date: Nov. 12, 2007

Test Panel    Description: IIIA Heavy

Manufacturer: In the Line of Fire, Inc    Sample No.: CDS-D

| | | | | | |
|---|---|---|---|---|---|
| Size: | 10 × 12 in | Heat No.: | NA | Date Received: | Nov. 12, 2007 |
| Thickness: | 0.638 in; 0.630 in; | Weight: | 4.13 lbs | Via: | Hand Carried |
| | 0.648 in; 0.647 in | Hardness: | NA | Returned: | Hand Carried |
| Avg. Thick: | 0.641 in | Plies/Laminates: | NA | | |

Setup

| | | | | | |
|---|---|---|---|---|---|
| Shot Spacing: | Per NIJ-STD-0101.04 Level IIIA | Primary Vel. Screens: | 6.5 ft, 11.5 ft | Range No.: | 2 |
| | | Primary Vel. Location: | 9 ft | Temp: | 68° F. |
| Witness Panel: | Clay | Range to Target: | 16.5 ft | BP: | 30.27 inHg |
| Obliquity: | 0° and 30° | Target to Witness: | 0 in | RH: | 37% |
| Backing Material: | 5.5 in Clay/Plywood | | | Barrel/Gun: | CDS-0193 |
| Condition: | Wet | | | Gunner: | J. McDowell |
| | | | | Recorder: | Craig Thomas |

Ammunition

| Projectile | Lot No. | Powder |
|---|---|---|
| (1) .44-mag., 240-grain SJHP | Lot No.: Remington 23592 | IMR 4227 |

Applicable Standards or Procedures (1) Clay Drops - 17 mm, 17 mm, 18 mm, 18 mm, 17 mm  
(2) NIJ-STD-0101.04 Level IIIA (abbreviated)

| Shot No. | Ammo | Time 1 (μs) | Vel. 1 (ft/s) | Time 2 (μs) | Vel. 2 (ft/s) | Avg Vel. (ft/s) | Penetration | Footnotes |
|---|---|---|---|---|---|---|---|---|
| 1 | 1 | 3517 | 1422 | 3527 | 1418 | 1420 | None | Def. 15 mm |
| 2 | 1 | 3469 | 1441 | 3468 | 1442 | 1442 | None | Def. 4 mm |
| 3 | 1 | 3480 | 1437 | 3491 | 1432 | 1435 | None | Def. 8 mm |
| 4 | 1 | 3464 | 1443 | 3474 | 1439 | 1441 | None | (a) |
| 5 | 1 | 3524 | 1419 | 3534 | 1415 | 1417 | None | (a) |
| 6 | 1 | 3479 | 1437 | 3489 | 1433 | 1435 | None | Def. 15 mm |

Remarks:  
Footnotes:  
(a) Impacted at 30° obliquity.

BALLISTIC RESISTANCE TEST

Chesapeake Testing  
121 Bata Boulevard, Suite F  
Belcamp, MD 21017

Client: In the Line of Fire, Inc.  
Job No.: N056-001-A  
Test Date: Nov. 12, 2007

Test Panel    Description: III Light

Manufacturer: In the Line of Fire, Inc.    Sample No.: CDS-A

| | | | | | |
|---|---|---|---|---|---|
| Size: | 10 × 12 in | Heat No.: | NA | Date Received: | Nov. 12, 2007 |

-continued

BALLISTIC RESISTANCE TEST

| Thickness: | 0.370 in; 1.379 in; | Weight: | 7.22 lbs | Via: | Hand Carried |
|---|---|---|---|---|---|
| | 0.353 in; 1.339 in | Hardness: | NA | Returned: | Hand Carried |
| Avg. Thick: | 1.360 in | Plies/Laminates: | NA | | |

Setup

| Shot Spacing: | Per NIJ-STD-0101.04 | Primary Vel. Screens: | 39.5 ft, 44.5 ft | Range No.: | 2 |
|---|---|---|---|---|---|
| | Level III | Primary Vel. Location: | 42 ft | Temp: | 68° F. |
| Witness Panel: | Clay | Range to Target: | 50 ft | BP: | 30.27 inHg |
| Obliquity: | 0° | Target to Witness: | 0 in | RH: | 37% |
| Backing Material: | 5.5 in Clay/Plywood | | | Barrel/Gun: | CDS-0200 |
| Condition: | Wet | | | Gunner: | Mike Murray |
| | | | | Recorder: | Craig Thomas |

Ammunition

| Projectile | Lot No. | Powder |
|---|---|---|
| (1) 7.62-mm, 149-grain M80 FMJ | Lot No.: Military Unknown | N133 |

Applicable Standards or Procedures (1) Clay Drops - 17 mm, 17 mm, 18 mm, 18 mm, 17 mm
(2) NIJ-STD-0101.04 Level III (abbreviated)

| Shot No. | Ammo | Time 1 (µs) | Vel. 1 (ft/s) | Time 2 (µs) | Vel. 2 (ft/s) | Avg Vel. (ft/s) | Penetration | Footnotes |
|---|---|---|---|---|---|---|---|---|
| 1 | 1 | 1809 | 2764 | 1809 | 2764 | 2764 | None | Def. 23 mm |
| 2 | 1 | 1785 | 2801 | 1786 | 2800 | 2800 | None | Def. 25 mm |
| 3 | 1 | 1803 | 2773 | 1804 | 2772 | 2772 | None | |
| 4 | 1 | 1805 | 2770 | 1806 | 2769 | 2769 | None | |
| 5 | 1 | 1786 | 2800 | 1788 | 2796 | 2798 | None | |
| 6 | 1 | 1806 | 2769 | 1808 | 2765 | 2767 | None | |

Remarks:            Footnotes:

BALLISTIC RESISTANCE TEST

Chesapeake Testing                                     Client: In the Line of Fire, Inc.
121 Bata Boulevard, Suite F                            Job No.: N056-001-B
Belcamp, MD 21017                                      Test Date: Nov. 12, 2007

Test Panel     Description: III Heavy

Manufacturer: In the Line of Fire, Inc.                Sample No.: CDS-B

| Size: | 10 × 12 in | Heat No.: | NA | Date Received: | Nov. 12, 2007 |
|---|---|---|---|---|---|
| Thickness: | 1.427 in; 1.376 in; | Weight: | 8.18 lbs | Via: | Hand Carried |
| | 1.343 in; 1.397 in | Hardness: | NA | Returned: | Hand Carried |
| Avg. Thick: | 1.386 in | Plies/Laminates: | NA | | |

Setup

| Shot Spacing: | Per NIJ-STD-0101.04 | Primary Vel. Screens: | 39.5 ft, 44.5 ft | Range No.: | 2 |
|---|---|---|---|---|---|
| | Level III | Primary Vel. Location: | 42 ft | Temp: | 68° F. |
| Witness Panel: | Clay | Range to Target: | 50 ft | BP: | 30.27 inHg |
| Obliquity: | 0° | Target to Witness: | 0 in | RH: | 37% |
| Backing Material: | 5.5 in Clay/Plywood | | | Barrel/Gun: | CDS-0200 |
| Condition: | Wet | | | Gunner: | Mike Murray |
| | | | | Recorder: | Craig Thomas |

Ammunition

| Projectile | Lot No. | Powder |
|---|---|---|
| (1) 7.62-mm, 149-grain M80 FMJ | Lot No.: Military Unknown | N133 |

-continued

BALLISTIC RESISTANCE TEST

Applicable Standards or Procedures (1) Clay Drops - 17 mm, 17 mm, 18 mm, 18 mm, 17 mm
(2) NIJ-STD-0101.04 Level III (abbreviated)

| Shot No. | Ammo | Time 1 (μs) | Vel. 1 (ft/s) | Time 2 (μs) | Vel. 2 (ft/s) | Avg Vel. (ft/s) | Penetration | Footnotes |
|---|---|---|---|---|---|---|---|---|
| 1 | 1 | 1791 | 2792 | 1793 | 2789 | 2790 | None | Def. 24 mm |
| 2 | 1 | 1781 | 2807 | 1783 | 2804 | 2806 | None | |
| 3 | 1 | 1780 | 2809 | 1782 | 2806 | 2807 | None | |
| 4 | 1 | 1777 | 2814 | 1778 | 2812 | 2813 | None | |
| 5 | 1 | 1766 | 2831 | 1768 | 2828 | 2830 | None | Def. 27 mm |
| 6 | 1 | 1789 | 2795 | 1791 | 2792 | 2793 | None | |

Remarks: Footnotes:

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

I claim:

1. A ballistic projectile armour comprising:
   a shatter resistant hard shell made from a material capable of deforming a projectile and slowing a velocity of the projectile;
   kinetic energy absorption material capable of deforming to further slow and capture the projectile after the projectile has pierced the hard shell with the kinetic energy absorption material comprising multiple, separate individual layers of ballistic fabric;
   an energy diffusing backing layer capable of diffusing energy transferred from the projectile into the kinetic energy absorption material; and
   an elastic containment for maintaining the multiple, separate individual layers of ballistic fabric sandwiched between the hard shell and the energy diffusing backing, and the elastic containment being able to elastically expand and accommodate expansion of the multiple, separate individual layers of ballistic fabric during energy absorption.

2. The ballistic projectile armour of claim 1, wherein the hard shell is made from one of an aerospace grade aluminum alloy, a ballistic grade aluminum alloy or ballistic grade steel alloy.

3. The ballistic projectile armour of claim 1, wherein the hard shell is made from one of a polymer plastic, a fiber-reinforced composite, or a composite.

4. The ballistic projectile armour of claim 3, wherein the ballistic grade plastic is an impact resistant polycarbonate.

5. The ballistic projectile armour of claim 1, wherein the energy diffusing backing layer is made from a ballistic grade plastic.

6. The ballistic projectile armour of claim 1, wherein the ballistic fabric is a microfiber mesh.

7. The ballistic projectile armour of claim 1, wherein the ballistic fabric is aramid.

8. The ballistic projectile armour of claim 1, wherein the elastic containment comprises an elastic edge binding in the form of an elastic tape that covers only an edge of the hard shell and an that binds the hard shell and the energy diffusing layer.

9. A ballistic projectile armour comprising:
   a shatter resistant hard shell made from one of an aerospace grade metal alloy or a ballistic grade metal alloy capable of deforming a projectile and slowing a velocity of the projectile;
   kinetic energy absorption material comprising multiple loose, separate, individual layers of ballistic microfiber mesh fabric capable of deforming to further slow and capture the projectile after it has pierced the hard shell;
   an energy diffusing backing layer made from a ballistic grade plastic capable of diffusing energy transferred from the projectile into the multiple loose, separate, individual layers of ballistic microfiber mesh fabric; and
   an elastic edge binding containment for binding the hard shell and the energy diffusing backing layer and keeping the multiple loose, separate, individual layers of ballistic microfiber mesh fabric sandwiched between the hard shell and the energy diffusing backing layer without compression of the multiple loose, separate, individual layers of ballistic microfiber mesh fabric, and the elastic edge binding containment having sufficient elasticity so as to facilitate elastically expanding to accommodate expansion of the kinetic energy absorption material during energy absorption, the elastic containment comprising an elastic tape that covers only an edge of the hard shell and an edge of the energy diffusing material and binds the hard shell and the energy diffusing layer.

* * * * *